United States Patent
Ullrich et al.

(10) Patent No.: US 9,758,139 B2
(45) Date of Patent: Sep. 12, 2017

(54) METHOD FOR OPERATING A BRAKE SYSTEM, AND BRAKE SYSTEM IN WHICH THE METHOD IS CARRIED OUT

(71) Applicant: Continental Teves AG & Co. oHG, Frankfurt (DE)

(72) Inventors: Thorsten Ullrich, Gernsheim (DE); Thomas Peichl, Wöllstadt (DE); Robert Schmidt, Kelkheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/441,288

(22) PCT Filed: Dec. 11, 2013

(86) PCT No.: PCT/EP2013/076298
§ 371 (c)(1),
(2) Date: May 7, 2015

(87) PCT Pub. No.: WO2014/090910
PCT Pub. Date: Jun. 19, 2014

(65) Prior Publication Data
US 2015/0298670 A1     Oct. 22, 2015

(30) Foreign Application Priority Data
Dec. 14, 2012   (DE) ........................ 10 2012 223 296

(51) Int. Cl.
*B60T 8/44*     (2006.01)
*B60T 8/36*     (2006.01)

(52) U.S. Cl.
CPC ............ *B60T 8/442* (2013.01); *B60T 8/3655* (2013.01)

(58) Field of Classification Search
CPC .............................. B60T 13/686; B60T 8/3275
(Continued)

(56) References Cited

U.S. PATENT DOCUMENTS 5,671,982 A     9/1997   Wanke
5,842,751 A    12/1998   Unterforsthuber
(Continued)

FOREIGN PATENT DOCUMENTS

| CN | 102143870 A | 8/2011 |
|----|-------------|--------|
| DE | 19755112    | 6/1998 |

(Continued)

OTHER PUBLICATIONS

International Search Report for International Application No. PCT/EP2013/076298 mailed Mar. 24, 2014.
(Continued)

*Primary Examiner* — Thomas J Williams
*Assistant Examiner* — James Hsiao
(74) *Attorney, Agent, or Firm* — RatnerPrestia

(57) ABSTRACT

A method for operating a brake system, which brake system includes a master brake cylinder, which is actuated by the driver with the aid of a brake force booster, a driver-independent pressure source, and at least one wheel brake to which a wheel speed sensor is assigned. During a braking operation initiated by the driver, which is identified in particular by a brake lamp switch, the present vehicle deceleration is determined and compared with a predefined threshold value, and the at least one driver-independent pressure source is activated if the determined vehicle deceleration reaches or falls below the predefined threshold value. A brake system for a motor vehicle, which brake system has a control unit in which the method is carried out is also disclosed.

10 Claims, 3 Drawing Sheets

(58) Field of Classification Search
USPC ........................................................ 303/155
See application file for complete search history.

(56) References Cited

U.S. PATENT DOCUMENTS

| | | | | |
|---|---|---|---|---|
| 6,033,038 | A | * | 3/2000 | Kulkarni ................. B60T 8/442 303/113.3 |
| 6,120,003 | A | * | 9/2000 | Lubischer ............... B60T 8/365 251/129.02 |
| 6,212,459 | B1 | | 4/2001 | Unterforsthuber |
| 6,361,126 | B1 | * | 3/2002 | Pueschel ................. B60T 8/442 303/113.3 |
| 6,715,846 | B1 | | 4/2004 | Pueschel |
| 7,140,699 | B2 | | 11/2006 | Gronau |
| 7,363,116 | B2 | * | 4/2008 | Flechtner ............. B60W 40/13 303/121 |
| 7,451,043 | B2 | * | 11/2008 | Schneider ............. B60K 28/16 180/197 |
| 7,739,014 | B2 | * | 6/2010 | Lu ......................... B60T 8/1755 303/146 |
| 7,970,512 | B2 | * | 6/2011 | Lu ......................... G05D 1/0891 303/146 |
| 2002/0109402 | A1 | * | 8/2002 | Nakamura .......... B60T 8/17552 303/146 |
| 2005/0082905 | A1 | * | 4/2005 | Gronau ..................... B60T 8/36 303/11 |
| 2011/0178688 | A1 | * | 7/2011 | Knechtges ............ B60T 8/3275 701/70 |

FOREIGN PATENT DOCUMENTS

| | | |
|---|---|---|
| DE | 19743960 | 4/1999 |
| DE | 19756080 | 7/1999 |
| DE | 19925794 | 12/2000 |
| DE | 10026365 | 11/2001 |
| DE | 10320175 | 12/2004 |
| EP | 0967131 | 12/1999 |
| EP | 1120323 | 8/2001 |
| EP | 0754607 | 1/2002 |
| EP | 0792229 | 3/2002 |
| WO | 9614227 | 5/1996 |
| WO | 03068574 | 8/2003 |
| WO | 2010015329 | 2/2010 |

OTHER PUBLICATIONS

Second Chinese Office Action for Chinese Application No. 201380065175.4, dated May 24, 2017, including English translation, 18 pages.

\* cited by examiner a)

b)

METHOD FOR OPERATING A BRAKE SYSTEM, AND BRAKE SYSTEM IN WHICH THE METHOD IS CARRIED OUT

CROSS REFERENCE TO RELATED APPLICATIONS

This application is the U.S. National Phase Application of PCT International Application No. PCT/EP2013/076298, filed Dec. 11, 2013, which claims priority to German Patent Application No. 10 2012 223 296.6, filed Dec. 14, 2012, the contents of such applications beign incorporated by reference herein.

FIELD OF THE INVENTION

The invention relates to a method for operating a brake system and to a brake system.

BACKGROUND OF THE INVENTION

Modern motor vehicles often have an underpressure brake booster with at least two chambers which are separated by a diaphragm, which underpressure brake booster superimposes an auxiliary force, built up by means of a pressure difference between the chambers, on the activation force applied to the brake pedal by the driver. The resulting overall force acts on a master brake cylinder which brings about a buildup of pressure and therefore a braking force in the wheel brakes of the vehicle. In this context, there is a boosting factor of for example 4:1 between the overall force and the activation force, with the result that even heavy vehicles can be braked with moderate activation forces. Since the underpressure or the pressure difference which serves as an energy source decreases with each activation, the underpressure brake booster is usually evacuated using the intake section of an internal combustion engine. In modern internal combustion engines with direct injection and/or turbocharging, a sufficient underpressure in the intake section is not ensured in every operating state, in particular not in a certain time period after a cold start of the internal combustion engine.

EP 0 754 607 B1, which is incorporated by reference, discloses a brake installation for motor vehicles having a brake booster which generates an output braking force by superimposing an auxiliary force on the activation force, and having a hydraulic wheel braking force control system, by means of which a higher pressure than the pressure applied by the output braking force can be generated in the wheel brake cylinders. In the brake installation, an evaluation device, which detects the undershooting of a predefined ratio of the auxiliary force to the activation force, and a control device are provided, said control device generating a setpoint pressure in the wheel brake cylinders by means of the hydraulic wheel brake control system after this ratio has been undershot, which setpoint pressure at least partially compensates the effects on the actual pressure by the auxiliary force which decreases in relation to the activation force.

If the auxiliary force is no longer in a predefined ratio with respect to the activation force and an increase in the brake pressure then only occurs as a result of the activation force applied by the driver, the modulation point of the brake booster is reached. The modulation point is dependent on the structural configuration of the brake system and the available underpressure. Even in the event of a defect in the underpressure brake booster, it is desirable to assist the driver by means of an additional buildup of hydraulic pressure, for example by means of an electric hydraulic pump.

WO 03/068574 A1, which is incorporated by reference, discloses a method for applying a predefined variable brake pressure in the wheel brakes of a brake installation, in which, in a control and/or data processing system, input variables which determine the brake pressure in the individual wheel brakes are evaluated and manipulated variables of hydraulic valves are defined. A characteristic curve is stored in the control or data processing system, said characteristic curve correlating the valve current of the hydraulic valve with a pressure difference of the hydraulic valve, and in accordance with the characteristic curve an electric valve current, by means of which the hydraulic valve is controlled in an analogous fashion, is defined. The electric valve current is expediently determined on the basis of the pressure difference between the setpoint pressure for the wheel brakes and the pressure of an activation device. The pressure of the activation device (the tandem master brake cylinder) is determined by means of a pressure sensor arranged in a brake circuit.

SUMMARY OF THE INVENTION

An aspect of the present invention is a method for operating a brake system and a brake system which compensates diminishing auxiliary force assistance by an underpressure brake booster without requiring the pressure in the master brake cylinder to be measured.

A method for operating a brake system is thus made available which comprises a master brake cylinder which can be activated by the driver using a brake booster, a driver-independent pressure source and at least one wheel brake to which a wheel speed sensor is assigned. According to the invention, in the case of braking by the driver, which braking can be detected, in particular, by means of a brake light switch and/or a pedal travel sensor, the current vehicle deceleration is determined and is compared with a predefined threshold value. The at least one driver-independent pressure source is activated as soon as the determined vehicle deceleration reaches or exceeds the threshold value. The pedal travel sensor can in this context also be embodied as a pedal angle sensor or as a travel sensor on a tandem master cylinder or diaphragm of the brake booster.

The method according to the invention checks in this context, on the basis of the current vehicle a deceleration, whether it is to be assumed that braking occurs above the modulation point (that is to say with a deceleration above the threshold value). The driver is then assisted with a buildup of hydraulic pressure. Sufficient braking force is therefore available even when there is an inadequate vacuum (i.e. an excessively high air pressure) in the brake booster without a pressure sensor being necessary in the brake circuit or brake system.

The predefined threshold value is expediently determined on the basis of the measured absolute pressure in an underpressure chamber of the brake booster or on the basis of a differential pressure between the underpressure chamber and the surroundings, wherein in particular the relationship between measured absolute pressure or differential pressure and the predefined threshold value is determined from a characteristic curve stored in an electronic control unit. The braking deceleration available at the modulation point given an assumed load, such as, in particular, a load corresponding to the maximum permissible total weight, can be determined in advance from the measured pressure in the brake booster and the configuration or the geometric dimensions. This relationship can be stored, for example, in the form of a characteristic curve and taken into account during the actuation of the brake system. If the vehicle has a load detection means, for example on the basis of a force balance during acceleration, the deceleration at the modulation point or generally the characteristic curve can be corrected on the basis of the determined vehicle mass.

The current vehicle deceleration is preferably determined from the signals of at least one wheel speed sensor. These sensors are also required for brake slip control and are therefore usually present in any case.

The brake system particularly preferably has a longitudinal acceleration sensor, and the determination of the current vehicle deceleration comprises correction of the vehicle deceleration, determined from signals of wheel speed sensors, by an amount which is caused by a longitudinal inclination of the roadway. The brake activation can therefore be corrected by the driver by an amount equal to the influence, for example, of travel on an uphill slope.

It is advantageous if a first solenoid valve which is, in particular, opened in a currentless state is arranged between the master brake cylinder and wheel brakes, and if the first solenoid valve can be actuated in an analogous fashion in order to maintain a predefined differential pressure between the master brake cylinder and wheel brakes. Since the first solenoid valve, in particular an isolating valve, opens, and the maximum pressure in the wheel brakes is therefore limited, when the differential pressure is exceeded, it is possible to dispense with pressure measurement in the wheel brakes. This overflow regulation of the isolating valve during which a predefined differential pressure is set between the wheel brake and the master cylinder permits a driver-independent pressure source to be superimposed on the brake pressure built up by the driver. A braking behavior which is convincing in terms of driving comfort and safety is therefore ensured.

It is particularly advantageous if the driver-independent pressure source comprises an electric hydraulic pump which is connected on the outlet side to the wheel brake or brakes and can be connected on the inlet side to the master brake cylinder via a second solenoid valve which is, in particular, closed in a currentless state, and activation of the driver-independent pressure source comprises at least partial closing of the first solenoid valve and opening of the second solenoid valve. For example, the rotational speed of the hydraulic pump can be selected in accordance with the desired pressure difference.

In particular, the predefined differential pressure between the master brake cylinder and wheel brakes is selected in accordance with the current deceleration. If the driver therefore brakes more strongly, a relatively strong auxiliary force component is built up by the driver-independent pressure source. The braking behavior remains consistent in the brake booster with and without sufficient underpressure.

An aspect of the invention also relates to a brake system for a motor vehicle, which comprises a master brake cylinder which is activated by the driver using a brake booster, and a driver-independent pressure source, in particular an electric hydraulic pump, at least one wheel brake to which a wheel speed sensor is assigned, and an electronic control unit having a memory and a computing unit which executes the aforementioned method.

The electronic control unit is expediently linked to the brake light switch and/or has a sensor for measuring the longitudinal acceleration. In this context, there can also be provision for the brake light switch to be embodied redundantly in order to ensure reliable detection of braking by the driver. If a sensor for measuring the longitudinal acceleration is present, the disturbing influence of a longitudinal gradient of the roadway can be compensated.

The electronic control unit preferably comprises a first solenoid valve which is arranged between the master brake cylinder and wheel brakes and is, in particular, opened in a currentless state, an electric hydraulic pump which is connected on the outlet side to the wheel brake or brakes, a second solenoid valve via which the electric hydraulic pump can be connected on the inlet side to the master brake cylinder and which is, in particular, closed in a currentless state, as well as an actuation circuit for the first solenoid valve and the second solenoid valve, wherein, in particular, the actuation circuit for the first solenoid valve has means for regulating a setpoint current. This permits overflow regulation of the isolating valve.

BRIEF DESCRIPTION OF THE DRAWINGS

Further preferred embodiments can be found in the dependent claims and the following description of an exemplary embodiment with reference to figures, in which:

DETAILED DESCRIPTION OF THE PREFERRED EMBODIMENTS

Figure 1:
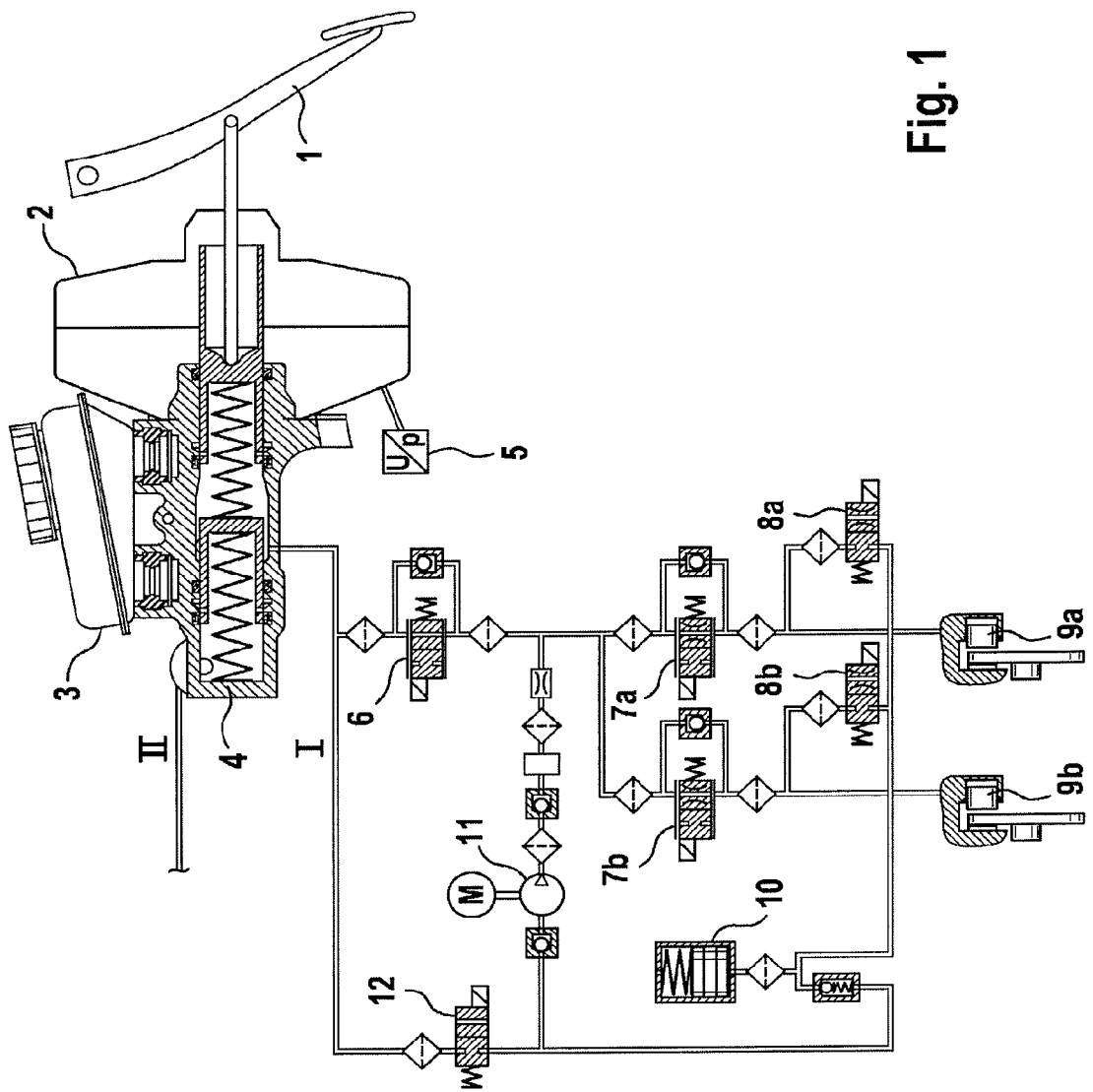
FIG. 1 shows an exemplary brake system.

FIG. 1 shows an exemplary brake system of a motor vehicle with which the method according to the invention can be carried out. The brake pedal 1 which can be actuated by the driver acts on a (tandem) master brake cylinder 4, via a pressure rod with superimposition of an auxiliary force built up by an underpressure brake booster 2, which (tandem) master brake cylinder 4 is connected in the unactivated state to a pressureless brake fluid reservoir container 3. The absolute pressure in the underpressure chamber or the differential pressure with respect to the surroundings can be measured by means of a vacuum sensor or pressure sensor 5. It is therefore possible to check whether sufficient underpressure is present or whether hydraulic assistance is necessary. The brake system has two brake circuits I, II, to each of which two wheel brakes are assigned (in the case of a four-wheeled motor vehicle). In the text which follows, only the brake circuit I is described; the other brake circuit II is of identical design. The division of the brake circuits, that is to say whether for example in each case a front wheel brake and a rear wheel brake are combined in a brake circuit, is in principle insignificant for the method according to the invention.

The master brake cylinder 4 is connected via brake lines to the wheel brakes 9a, 9b, wherein the first wheel brake 9a can be disconnected from the master brake cylinder 4 by closing a first inlet valve 7a, and the second wheel brake 9b can be disconnected from the master brake cylinder 4 by means of a second inlet valve 7b. The pressure in the first and second wheel brakes can be reduced by opening an outlet valve 8a or 8b in that brake fluid is diverted into a low pressure accumulator 10. An electrically driven hydraulic pump 11 permits the low pressure accumulator 10 to be emptied. In addition, the brake system has a solenoid valve 6 which is designated an isolating valve, can be actuated in an analogous fashion, is open in a currentless state and is arranged between the outlet side of the hydraulic pump 11 and the master brake cylinder. The suction side of the hydraulic pump 11 is connected to the low pressure accumulator 10 and can be connected to the master brake cylinder 4 via a solenoid valve which is also known as an electronic switching valve and is closed in a currentless state.

Wheel speed sensors (not shown), which are connected to an electronic control unit (not shown either), are expediently arranged on each wheel of the motor vehicle. If the wheel speed of a wheel during braking decreases strongly, a brake slip control process or antiblock brake control process can take place in that the corresponding inlet valve is closed and the pressure in the wheel brake, and therefore the braking force, are reduced by opening the corresponding outlet valve. The brake slip control process can be carried out by means of methods which are known per se and in which pressure buildup phases, pressure holding phases and pressure reduction phases repeat cyclically. The electronic control unit can also make available a yaw moment process which is known per se, as described, for example, in EP 0 792 229 B1, which is incorporated by reference. The electronic control unit is expediently also connected to a longitudinal acceleration sensor (not shown either). The actuation of the brake system for a driver-independent pressure buildup is explained below in conjunction with FIG. 2.

Figure 2:
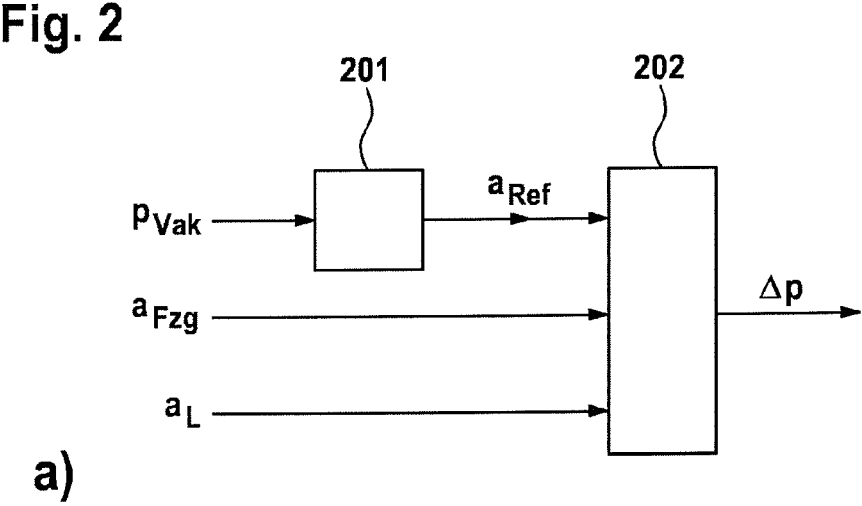
FIG. 2 shows a schematic illustration relating to the calculation of the desired pressure difference between the master brake cylinder and wheel brakes.
Figure 2:
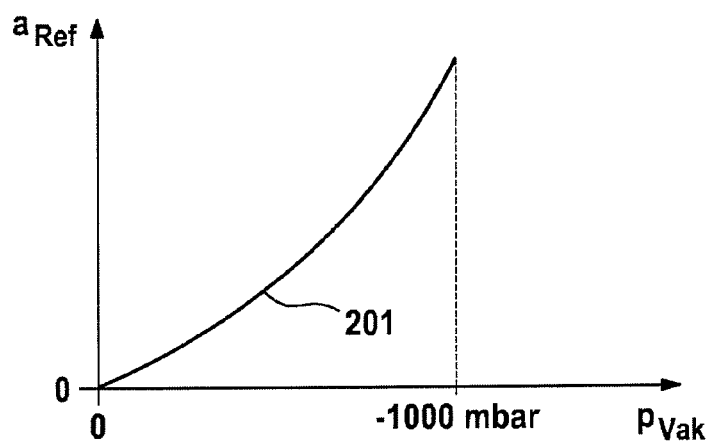

FIG. 2 (a) is a schematic view of the procedure for determining a desired pressure difference between the master brake cylinder and wheel brakes. In this context, the pressure $p_{Vak}$, which is measured by the vacuum sensor 5, the vehicle deceleration $a_{Fzg}$ determined from wheel speed sensor signals and preferably the longitudinal acceleration $a_L$ measured with a longitudinal acceleration sensor serve here as input variables.

The threshold value for the deceleration at the modulation point $a_{Ref}$ is determined from the measured pressure in the underpressure chamber by means of a calibration curve 201. The calibration curve is expediently measured with a test vehicle and stored in a memory of the electronic control unit. For example, a number of reference points, between which linear or polynomial interpolation is carried out, can be stored. It is also possible to provide for parameters of a curve which is adapted to the measurement data to be determined, for example, according to the method of the least mean squares, and to be stored in the control unit. An exemplary calibration curve is shown as the line 201 in FIG. 2 (b), wherein the deceleration $a_{Ref}$ is represented as a function of the measured underpressure $Dp_{Vak}$. Since the air pressure under usual ambient conditions is approximately 1000 mbar, the full boosting up to a maximum deceleration is available given an absolute pressure of approximately 0 bar or a relative pressure in the underpressure chamber of −1000 mbar. If the underpressure during, for example, a cold start of the engine is only 200 mbar, the modulation point of the brake booster is already reached when there is a relatively low deceleration.

If the change over time in the signals of wheel speed sensors, in particular of non-driven wheels, is considered, the current acceleration or deceleration $a_{Fzg}$ of the vehicle can be determined therefrom. If the motor vehicle has a longitudinal acceleration sensor (which is used for example for a hill starting aid), the current acceleration can be corrected by an amount equal to the influence of a longitudinal inclination of the roadway using the measured value $a_L$ of said longitudinal acceleration sensor. The appropriately corrected, current deceleration of the vehicle is interpreted as an indication of the driver's braking request and compared with the threshold value $a_{Ref}$. If the current deceleration exceeds the threshold value, that is to say if support by the driver-independent pressure source is necessary, a desired pressure difference $\Delta_p$ is determined on the basis of a predefined boosting characteristic which is expediently also stored in the memory of the electronic control unit.

In order to compensate the insufficient auxiliary force assistance by the brake booster, a desired pressure difference is therefore built up in addition to the driver's brake pressure in that the isolating valve 6 is closed, the switching valve 12 opened and the pump activated (while the inlet valves 7a, 7b are open and the outlet valves 8a, 8b are closed). In this context, the isolating valve 6 is actuated in an analogous fashion in that the actuation circuit of the valve applies a setpoint current in accordance with a valve characteristic curve. The valve characteristic curve indicates the relationship between the valve current of a solenoid valve and the maximum pressure difference; it is expediently determined by measuring the valve and/or performing calibration at the end of the production line in the factory and is stored in the electronic control unit. As soon as the pressure in the wheel brakes is above the pressure in the master brake cylinder by more than the desired pressure difference $\Delta_p$, the isolating valve opens. With respect to further details on the overflow regulating process or the actuation of the isolating valve, in particular on possible strategies, reference is made to WO 03/068574 A1, which is incorporated by refererence.

Figure 3:
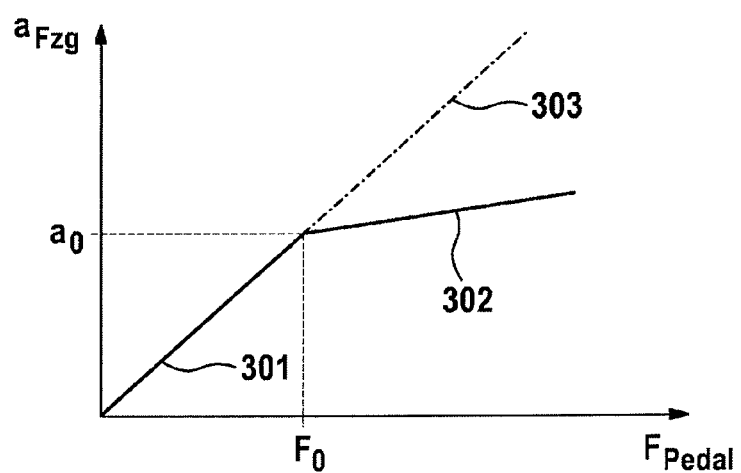
FIG. 3 shows the general relationship between the pedal force and the braking deceleration.

FIG. 3 shows a diagram of the relationship between the deceleration of the vehicle $a_{Fzg}$ and the pedal force $F_{Pedal}$ which is applied by the driver. As is indicated by line 301, as the pedal force rises the braking deceleration increases linearly until at a pedal force $F_o$ the deceleration is achieved at the modulation point $a_o$. A further brake pressure buildup takes place starting from now in an unboosted fashion, i.e. the gradient of the line 302 is significantly smaller than the gradient of the line 301. As a result of the fact that a driver-independent pressure buildup takes place in order to compensate the lack of braking force support, the method according to the invention can, as shown in line 303, provide the driver with a consistent braking behavior even above the modulation point. Since the pressure buildup takes place using an overflow regulating process, it is possible to dispense with a pressure sensor at the master brake cylinder.

The invention claimed is:

1. A method for operating a brake system, comprising a master brake cylinder which can be activated by the driver using a brake booster, a driver-independent pressure source, at least one wheel brake to which a wheel speed sensor is assigned, wherein in the case of braking by the driver, the method comprises:

storing a characteristic curve in an electronic control unit, the characteristic curve representing a relationship between vehicle deceleration and pressure;

measuring i) an absolute pressure in an underpressure chamber of the brake booster or ii) a differential pressure between the underpressure chamber and an exterior of the underpressure chamber;

predefining a threshold deceleration value on the basis of the measured absolute pressure or on the basis of the measured differential pressure using the characteristic curve, detecting braking by a brake light switch and/or a pedal travel sensor, determining the current vehicle deceleration, comparing the current vehicle deceleration with the predefined threshold deceleration value, and activating at least one driver-independent pressure source as soon as the determined vehicle deceleration reaches or exceeds the threshold deceleration value.

2. The method as claimed in claim 1, wherein the determining of the current vehicle deceleration is based on the signals of at least one wheel speed sensor.

3. The method as claimed in claim 2, wherein the brake system comprises a longitudinal acceleration sensor, and the determining of the current vehicle deceleration additionally comprises correcting the vehicle deceleration, determined from signals of the wheel speed sensors, by an amount which is caused by a longitudinal inclination of the roadway.

4. The method as claimed in claim 1, wherein a first solenoid valve which is opened in a currentless state is arranged between the master brake cylinder and the wheel brakes, and the method further comprises actuating the first solenoid valve in an analogous fashion in order to maintain a predefined differential pressure between the master brake cylinder and the wheel brakes.

5. The method as claimed in claim 4, wherein the driver-independent pressure source comprises an electric hydraulic pump which is connected on an outlet side to the wheel brake or brakes and can be connected on an inlet side to the master brake cylinder via a second solenoid valve which is, closed in a currentless state, and the activating of the driver-independent pressure source comprises at least partially closing the first solenoid valve and opening of the second solenoid valve.

6. The method as claimed in claim 4, wherein the predefined differential pressure between the master brake cylinder and the wheel brakes is selected in accordance with the current deceleration.

7. A brake system for a motor vehicle, comprising:
a master brake cylinder which is activated by the driver using a brake booster, and a driver-independent pressure source,
at least one wheel brake to which a wheel speed sensor is assigned, and
an electronic control unit having a memory and a computing unit which executes a method comprising:
storing a characteristic curve in an electronic control unit, the characteristic curve representing a relationship between vehicle deceleration and pressure;
measuring i) an absolute pressure in an underpressure chamber of the brake booster or ii) a differential pressure between the underpressure chamber and an exterior of the underpressure chamber;
predefining a threshold deceleration value on the basis of the measured absolute pressure or on the basis of the measured differential pressure using the characteristic curve;
detecting braking by a brake light switch and/or a pedal travel sensor;
determining the current vehicle deceleration;
comparing the current vehicle deceleration with the predefined threshold deceleration value; and
activating at least one driver-independent pressure source as soon as the determined vehicle deceleration reaches or exceeds the threshold deceleration value.

8. The brake system as claimed in claim 7, wherein the electronic control unit is linked to a brake light switch and/or a pedal travel sensor and/or has a sensor for measuring the longitudinal acceleration.

9. The brake system as claimed in claim 7, wherein the electronic control unit has a first solenoid valve which is arranged between the master brake cylinder and wheel brakes and is opened in a currentless state, an electric hydraulic pump which is connected on the outlet side to the wheel brake or brakes, a second solenoid valve via which the electric hydraulic pump can be connected on an inlet side to the master brake cylinder and which is closed in a currentless state, as well as an actuation circuit for the first solenoid valve and the second solenoid valve, wherein the actuation circuit for the first solenoid valve has means for regulating a setpoint current.

10. A brake system for a motor vehicle as claimed in claim 7, wherein the driver-independent pressure source is an electric hydraulic pump.

* * * * *